Feb. 6, 1951     T. M. BERRY     2,540,807
CENTER OF GRAVITY INDICATOR
Filed May 25, 1944     5 Sheets-Sheet 1
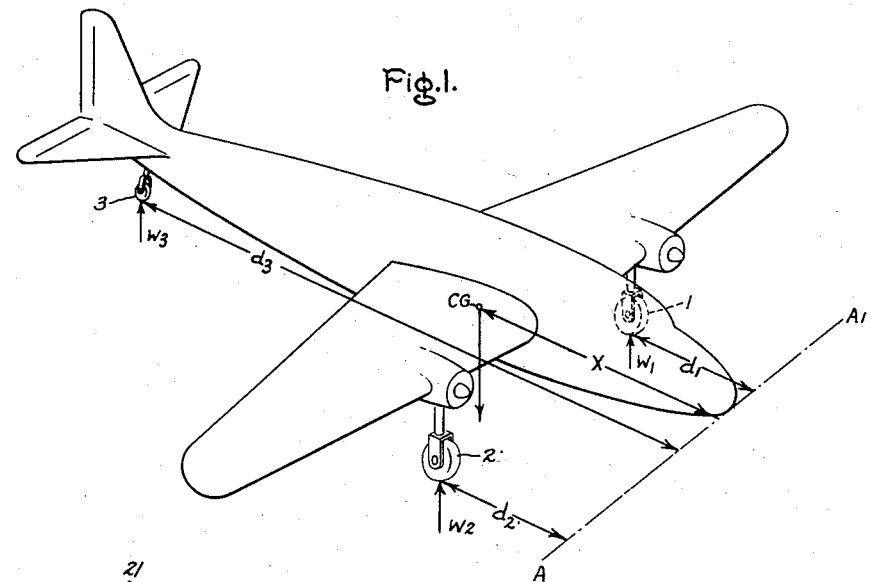
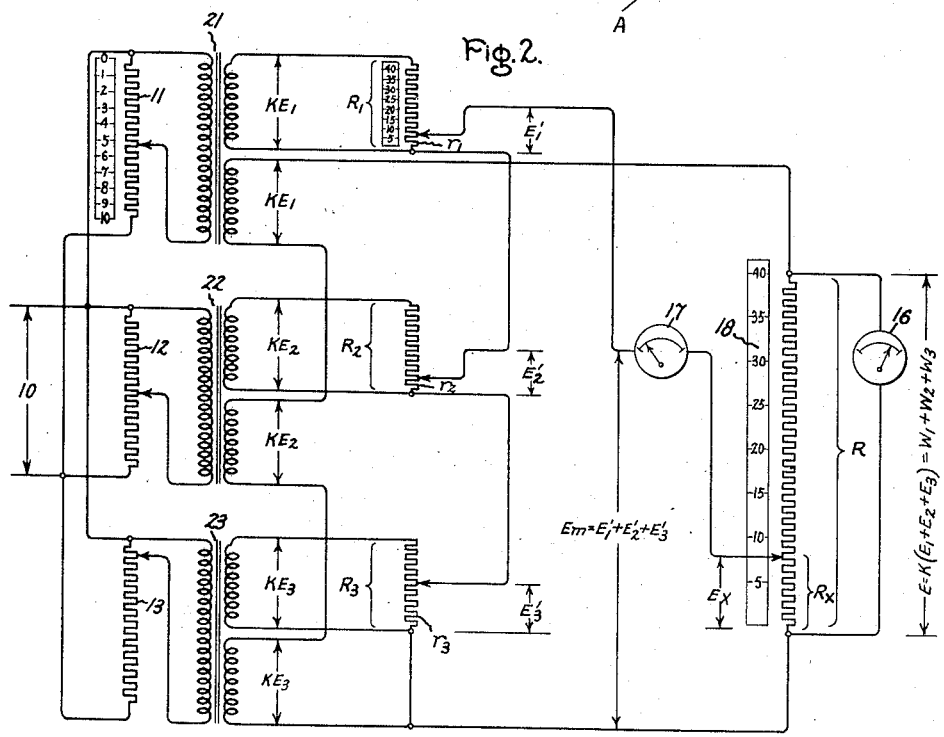
Inventor:
Theodore M. Berry,
by Harry E. Dunham
His Attorney.

Feb. 6, 1951      T. M. BERRY      2,540,807

CENTER OF GRAVITY INDICATOR

Filed May 25, 1944      5 Sheets-Sheet 2

Inventor:
Theodore M. Berry,
by Harry E. Dunham
His Attorney.

Feb. 6, 1951 — T. M. BERRY — 2,540,807
CENTER OF GRAVITY INDICATOR
Filed May 25, 1944 — 5 Sheets-Sheet 3

Inventor:
Theodore M. Berry,
by Harry E. Dunham
His Attorney.

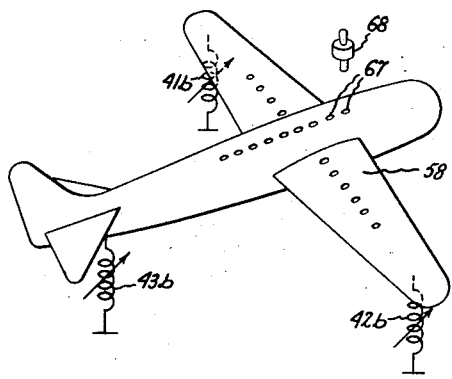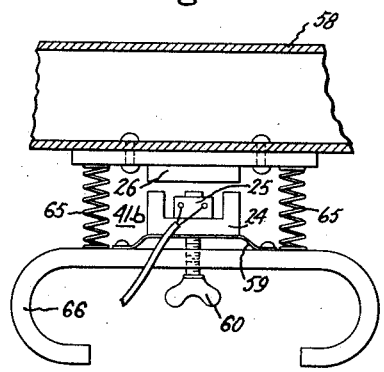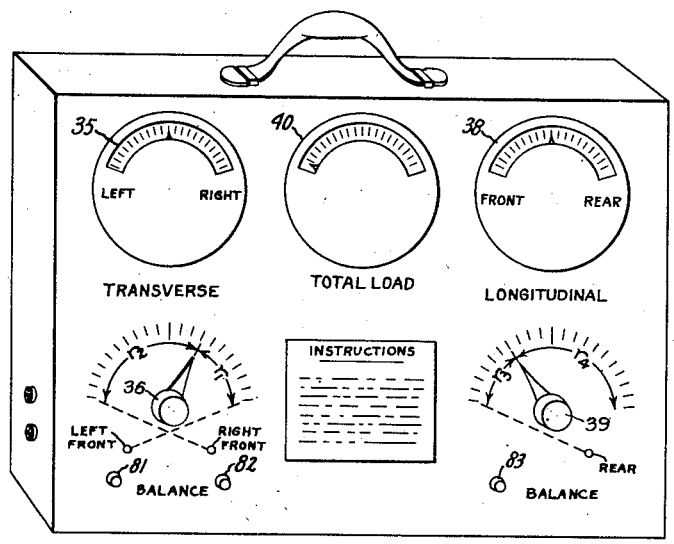

Feb. 6, 1951 T. M. BERRY 2,540,807
CENTER OF GRAVITY INDICATOR
Filed May 25, 1944 5 Sheets-Sheet 5

Inventor:
Theodore M. Berry,
by Harry E. Dunham
His Attorney.

Patented Feb. 6, 1951

2,540,807

UNITED STATES PATENT OFFICE 2,540,807

CENTER OF GRAVITY INDICATOR

Theodore M. Berry, Schenectady, N. Y., assignor to General Electric Company, a corporation of New York Application May 25, 1944, Serial No. 537,314

8 Claims. (Cl. 73—65)

My invention relates to weight distribution indicators and apparatus and while not limited thereto, it is particularly suitable for use in the loading of airplanes to readily determine the center of gravity of the airplane load and may include the weight of the plane itself, and to indicate the direction and extent to which the load should be shifted to obtain a loading most desirable for the safe and efficient operation of the plane, and to indicate when such desirable loading has been obtained, and to indicate the total load. The apparatus may include means for compensating for the difference in level of the airplane when on the ground and when in normal flight, and for wind effects where the plane is being loaded in a wind.

Figure 3:
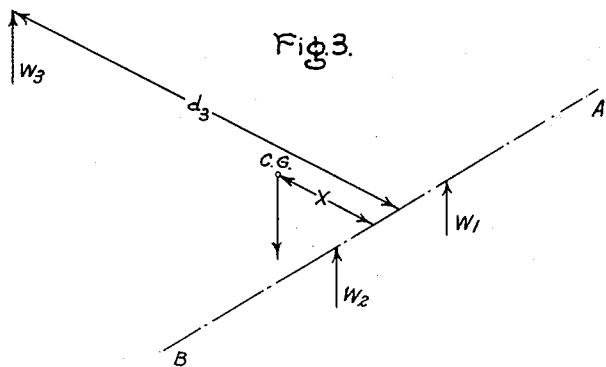
Figure 4:
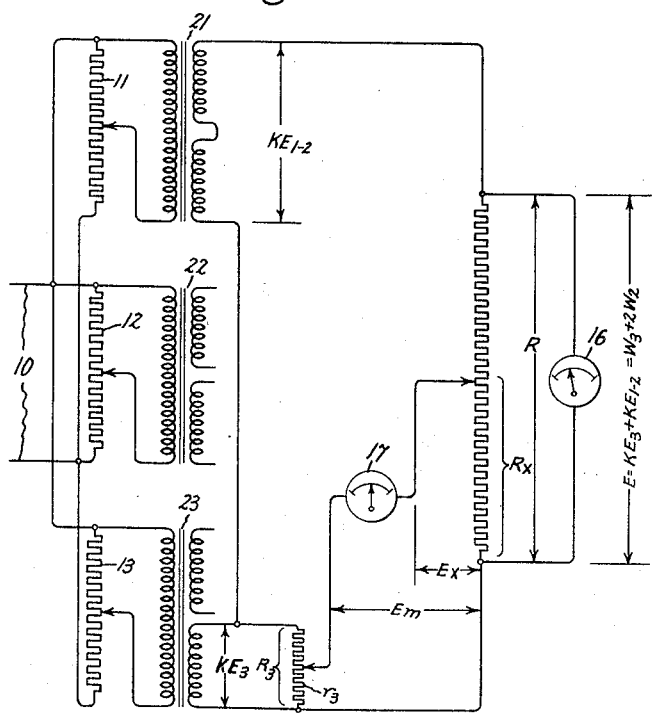
Figure 5:
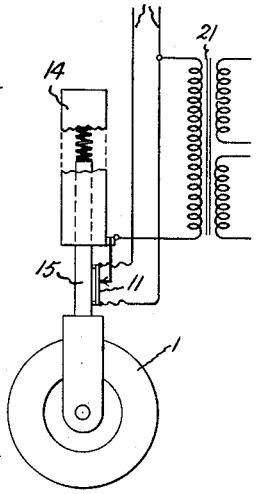
Figure 6:
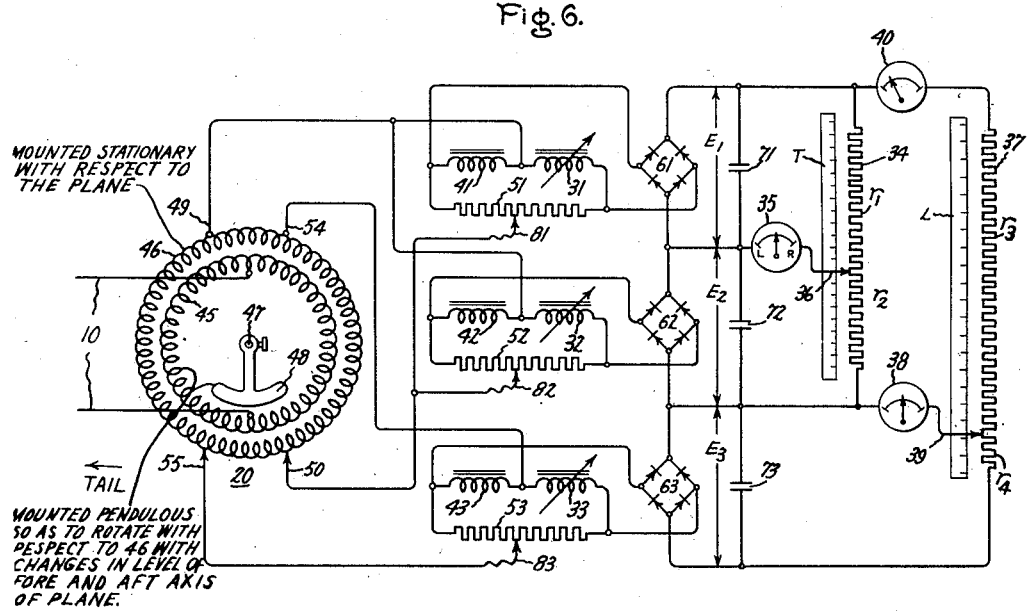
Figure 6A:
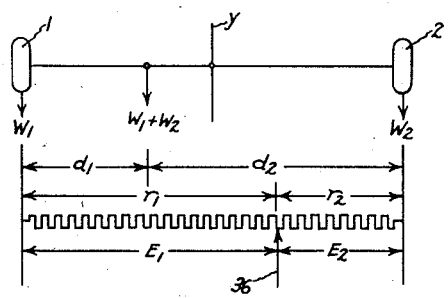
Figure 7:
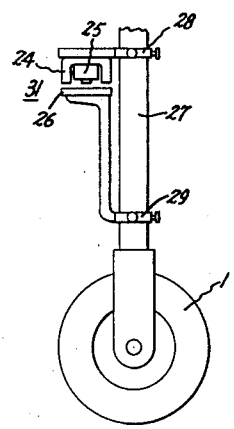
Figure 8:
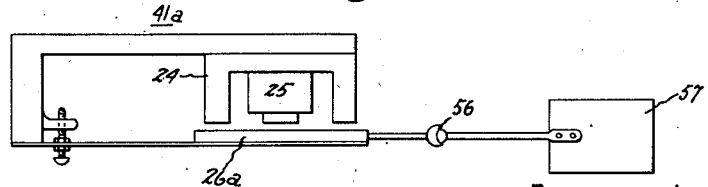

The features of my invention which are believed to be novel and patentable will be pointed out in the claims appended hereto. For a better understanding of my invention, reference is made in the following description to the accompanying drawing in which Fig. 1 represents an airplane in outline with certain weight and distance component factors applied thereto to be referred to in explaining the principle of operation of my invention. Fig. 2 represents electrical circuits by means of which electrical voltages representing weight and distance component factors are derived and controlled to obtain measurements in terms of plane loading. Fig. 3 is a simplified weight and distance component diagram for an airplane of the type represented in Fig. 1. Fig. 4 is a simplified circuit diagram that may be used where the center of gravity of an airplane along its fuselage axis only is to be determined. Fig. 5 indicates how a resistance type weight responsive regulator may be applied to the landing wheel structure of an airplane. Fig. 6 represents a preferred wiring diagram for the invention employing rectification of the measurement voltages involved. Fig. 6a represents pictorially relationship pertaining to Fig. 6. Fig. 7 represents how an electromagnetic type weight response regulator may be applied to an airplane landing gear. Fig. 8 represents one form of wind compensating device. Fig. 9 represents the use of a small airplane gauge standard that may be used for wind compensation and calibrating purposes. Fig. 10 shows one of the electromagnetic gauges used in Fig. 9. Fig. 11 represents a portable cabinet for housing most of the parts of the apparatus represented in Fig. 6, and Figs. 12 and 13 relate to a scheme for compensating for different airplane levels.

When an airplane is loaded, it is desirable that the load be properly distributed relative to the longitudinal and cross axes of the plane. By longitudinal axis I mean the axis through the center of the plane in the direction of its line of flight, and by transverse axis I means a horizontal axis at right angles to the longitudinal axis and may, for instance, be a line drawn between the tips of the wings. The distribution of the load carried by an airplane has an important bearing on the efficiency of operation and degree of safety of the plane and the amount of load it can safely carry, and it thus becomes desirable to know where the center of gravity of the plane load is and to correct it as required during loading operations and partial unloading operations or, at least, before a take-off. The present invention relates to relatively simple apparatus for indicating at all times while the plane is on the ground, before, during, and after loading where the center of gravity of the airplane or its load, if any, is located, or the center of gravity of both the airplane and its load. The apparatus in question also indicates the total weight of the airplane or its load, or both.

In Fig. 1, let 1, 2, and 3 represent the left front, right front, and rear landing wheels of the airplane indicated, and $W_1$, $W_2$, and $W_3$ the weights of the airplane and its load supported by the corresponding wheels when the airplane is resting on level ground. The horizontal distance X from any arbitrary transverse axis of reference A—A' to the center of gravity is equal to the sum of the moments of $W_1$, $W_2$, and $W_3$ about that axis divided by the total weight. Thus, $$X = \frac{W_1 d_1 + W_2 d_2 + W_3 d_3}{W_1 + W_2 + W_3}$$

then $$X(W_1 + W_2 + W_3) = W_1 d_1 + W_2 d_2 + W_3 d_3$$

and (1)
$$X(W_1 + W_2 + W_3) - (W_1 d_1 + W_2 d_2 + W_3 d_3) = 0$$

In accordance with my invention I derive electrical voltages proportional to $W_1$, $W_2$, and $W_3$, and the known factors in the above equations, whereupon the problem of indicating the distance X to the center of gravity becomes relatively simple by the use of suitably calibrated apparatus for comparing the relative values of the different voltages.

One electrical system suitable for this purpose is shown in Fig. 2. In Fig. 2 I have shown three resistances 11, 12 and 13 connected in parallel across an A.-C. source of supply 10, each resistance having leads, one of which is adjustable, leading to the primaries of three similar transformers 21, 22 and 23. The voltages supplied to the transformers are made proportional to the weights $W_1$, $W_2$, and $W_3$ supported by the wheels 1, 2, and 3, respectively, Fig. 1. One way in which this may be accomplished is represented in Fig. 5 where the resistance 11 for wheel 1 is suitably attached to the fork support 15 of the wheel, and the adjustable tap for the resistance 11 is suitably attached to the part 14 which is fastened to the plane. Parts 14 and 15 may comprise relatively movable resiliently cushioned shock absorber parts, part 15 sliding into part 14 a distance proportional to the weight of the plane supported by wheel 1. The adjustable resistance and leads thereto are insulated from the metallic plane parts, and as a consequence of the arrangement, as the weight increases the tap slides down across the resistance 11 and picks off a higher and higher voltage which is supplied to the primary of the corresponding transformer 21. The other wheels of the plane will be similarly provided with such adjustable resistances responsive to the weights supported by the corresponding wheels. The resistances 11, 12, and 13 are so graduated and adjusted that the voltages supplied to the transformers are similarly proportional to the weights $W_1$, $W_2$, and $W_3$, respectively. Calibration may be accomplished by running the plane onto three platform weighing scales, with one wheel on each, for example, and using voltmeters to indicate the voltages obtained and making such adjustments in the resistances and relatively movable parts as is necessary for correct calibration.

The transformers 21, 22, and 23 each has two similar secondary windings, and hence there are produced across each secondary winding voltages proportional to the weights $W_1$, $W_2$, and $W_3$, and I have designated these voltages for the three transformers $KE_1$, $KE_2$, and $KE_3$, respectively, where $K$ is a constant. The lower secondary windings of the three transformers are connected in adding series relation across a resistance $R$, and hence the voltmeter 16 connected across the resistance $R$ will indicate a voltage $$E = KE_1 + KE_2 + KE_3 = W_1 + W_2 + W_3$$

and may be calibrated in terms of the total weight of the plane.

The upper secondary windings of the three transformers 21, 22, and 23 are connected across similar uniform resistances $R_1$, $R_2$, and $R_3$, respectively. Each of the resistances $R_1$, $R_2$, $R_3$ and $R$ has a sliding tap, and the portions of the resistances $R_1$, $R_2$, $R_3$, and $R$ shown below their respective taps are connected in series relation through a voltmeter 17. It is understood that the resistances referred to herein are uniformly graduated and when a distance unit scale is used equal divisions on the scale correspond to equal values of resistance along the scale. The resistance parts shown below the taps on resistances $R_1$, $R_2$, $R_3$, and $R$ are designated $r_1$, $r_2$, $r_3$ and $R_x$, respectively. The voltages across $r_1$, $r_2$, and $r_3$ are connected in adding relation and in opposition to the voltage across $R_x$ in the circuit of voltmeter 17. The ratios of the resistances $$\frac{r_1}{R_1}, \frac{r_2}{R_2}, \frac{r_3}{R_3}$$

are made similarly proportional to the known distances $d_1$, $d_2$, and $d_3$, respectively, of Fig. 1, and hence $$d_1 = \frac{r_1}{R_1}, d_2 = \frac{r_2}{R_2}, \text{ and } d_3 = \frac{r_3}{R_3}$$

The voltages across the resistances $r_1$, $r_2$, and $r_3$ and $R_x$ are designated $E'_1$, $E'_2$, $E'_3$ and $E_x$, respectively. The sum of the voltages across the resistances $r_1$, $r_2$, and $r_3$ is designated $E_m$. These values are indicated on Fig. 2. It is evident that $E'_1$, $E'_2$, and $E'_3$ are respectively equal to $$KE_1 \frac{r_1}{R_1}, KE_1 \frac{r_2}{R_2}, \text{ and } KE_1 \frac{r_3}{R_3}$$

It can now be shown that if the tap on resistance $R$ be adjusted to a position where the voltmeter 17 reads zero, such that $E_m = E_x$, Fig. 2, the distance of said tap from the bottom of the resistance $R$ corresponds to the distance $X$ in Fig. 1, and that a distance scale 18 may be provided along the resistance $R$ from which the distance $X$, Fig. 1, may be read.

Thus, $$E_m = E'_1 + E'_2 + E'_3 = KE_1\frac{r_1}{R_1} + KE_2\frac{r_2}{R_2} + KE_3\frac{r_3}{R_3}$$

Since $$W_1 = KE_1 \text{ and } d_1 = \frac{r_1}{R_1} \text{ etc.}$$

$$E_m = W_1 d_1 + W_2 d_2 + W_3 d_3$$

When the voltage across meter 17 is zero, $$E_m = E_x = \frac{R_x}{R} E = \frac{R_x}{R}(W_1 + W_2 + W_3)$$

Then $$W_1 d_1 + W_2 d_2 + W_3 d_3 = \frac{R_x}{R}(W_1 + W_2 + W_3)$$

and (2) $\quad \frac{R_x}{R}(W_1 + W_2 + W_3) - (W_1 d_1 + W_2 d_2 + W_3 d_3) = 0$ Comparing Equation 2 with Equation 1, it can be seen that these equations are identical if $$\frac{R_x}{R} = X$$

It follows then that the distance $X$ from the axis A—A', Fig. 1, is represented by the ratio of $$\frac{R_x}{R}$$

in Fig. 2, which means that the linear potentiometer $R$ with its linear scale 18 indicates the horizontal distance from the predetermined axis to the center of gravity. If the distances $d_2$, $d_1$, $d_3$, and $X$ are measured in feet, the scale 18 may be a foot scale. Likewise, there will be foot scales or dials graduated in feet along resistances $R_1$, $R_2$, and $R_3$, such as shown opposite resistance $R_1$. To illustrate; when the tap along resistance $R_3$ is at midpoint of the resistance, $$\frac{r_3}{R_3} = \frac{1}{2}$$

when at one-fourth the length of the resistance from the bottom, $$\frac{r_3}{R_3} = \frac{1}{4}, \text{ etc.}$$

Multiplying the scale thus obtained by any convenient factor such as 40, we obtain the scale shown. Similarly with scale 18 along resistance $R$.

A complete example will now be given. Assume that $W_1$, $W_2$ and $W_3$ in Fig. 1 are 5, 6 and 1 ton, respectively, and that $d_1$, $d_2$, and $d_3$ are 5, 5, and 25 feet, respectively; resistances 11 12, and 13 will be set automatically by the weight responsive rheostats such as shown in Fig. 5, although it is equally possible to measure the weights by scales and set these rheostats by hand. In either case the resistances 11, 12, and 13 will be set to produce voltages $KE_1$, $KE_2$, and $KE_3$ in the relation 50, 60, and 10, respectively. Now the resistances $R_1$, $R_2$, and $R_3$ will be set so that their dials indicate 5, 5, and 25, respectively. Then the tap on resistance R is adjusted until voltmeter 17 reads zero. It will be found in the above example that the center of gravity of the plane from the axis A—A' is 6⅔ feet. The instrument 16 will read 12 tons. In the above example if we take moments about a transverse axis through the front wheels or axis A—B, Fig. 3, $d_1$, $d_2$, and $d_3$ become 0, 0, and 20, and $R_x$ becomes 1⅔ feet from the new moment axis. The correctness of the solutions may be verified by substituting the assumed values in Equation 2 in the two examples given.

If it is desired to find the center of gravity of the plane in a direction at right angles to the axis assumed, the same apparatus is used and the same procedure is employed. This involves only a resetting of the rheostats $R_1$, $R_2$, $R_3$, and R.

If we assume that the center of gravity in a transverse direction cannot be shifted enough to cause any worry, we can say that $W_1 = W_2$, and the problem of finding the center of gravity along the longitudinal axis and its solution become still simpler. Referring to Fig. 3 and taking moments about axis A—B, we find that $X(W_1+W_2+W_3) = W_3 d_3$; and if $W_1 = W_2$ $$X(2W_1+W_3) = W_3 d_3;$$

and we may simplify the electrical computing apparatus to that shown in Fig. 4 where only a part of the same apparatus of Fig. 2 is used.

In Fig. 4, $$W_3 + 2W_1 = E$$

$$d_3 = \frac{r_3}{R_3}$$

$$E_m = KE_3 \frac{r_3}{R_3}$$

$$E_x = E\frac{R_x}{R} = \frac{R_x}{R}(KE_3 + KE_{1-2})$$

Now when voltmeter 17 reads zero:

$$E_m = E_x = KE_3\frac{r_3}{R_3} = \frac{R_x}{R}(KE_3 + KE_{1-2})$$

or $$W_3 d_3 = X(W_3 + 2W_2)$$

Slightly more accurate results might be obtained by using both rheostats 11 and 12 in Fig. 2 and adding their voltages as in Fig. 2. It will be noted that the center of gravity computer is independent of variations of voltage of the source of supply. However, if the totalizing instrument 16 is to be used, the voltage of the source of supply should be maintained constant. In the examples heretofore given it was assumed that the apparatus took into consideration not only the weight on the plane but also the weight of the plane when empty. If it is desired to use the computer for merely the p'ane load less the weight of the plane when empty, the adjustable resistances 11, 12, and 13 will be arranged so that the voltages which they supply to the transformers will be zero when the plane is empty. This can be accomplished, for example, by moving the resistance 11, Fig. 5, downward with respect to the tap so that the tap just makes contact at the zero voltage end or top of the resistance when the plane is empty, and recalibrating for the additional load.

A wiring diagram for a preferred arrangement which contains some simplification but which uses the same general principle as the apparatus of Fig. 2 is shown in Fig. 6. An A.-C. source 10 feeds through a transformer 20 which for the present will be assumed to supply equal voltages to three reactance bridges having the variable reactance arms 31, 32 and 33. Reactance arms 41, 42, and 43 of these bridges will for the present be assumed to be constant. The other two arms of the bridges are formed by resistances 51, 52, and 53 with a variable tap connected to the supply source dividing the resistances into the two other arms of such bridges. The output voltages of the bridges are rectified by three full-wave rectifiers 61, 62, and 63, and the rectified voltages are smoothed by condensers 71, 72 and 73.

The reactances 31, 32, and 33 are varied in response to the weights supported by the three airplane wheels, 1, 2, and 3, respectively, of Fig. 1, and the character of such variable reactance and the general manner of varying the same are indicated in Fig. 7. The reactance may comprise an E-shaped core 24 of magnetic material having a winding 25 on its middle leg and a relatively movable armature of magnetic material 26 extending across and adjacent the pole faces of the magnet. The two parts are shown fastened to the fork support structure 27 of the wheel at points some distance apart by clamps 28 and 29 such that compression of the support, when subjected to a weight, will decrease the air gap in the electromagnetic circuit and increase the reactance. It is to be understood that Fig. 7 is more or less diagrammatic and that the details of such magnetic strain gauge are not part of the present invention, and that any suitable form of magnetic strain gauges may be used. A strain gauge which may be used is shown in United States Patent No. 2,242,011, May 13, 1941, to Malmberg. Each wheel is equipped with a suitable magnetic-type strain gauge, and the rectifier and bridge arrangement is such that direct current output voltages $E_1$, $E_2$, and $E_3$ proportional to the weights $W_1$, $W_2$, and $W_3$, respectively, are produced. The rectifiers 61 and 62 supply voltages $E_1$ and $E_2$ respectively which feed a resistance at 34, and a voltmeter 35 is connected between these rectifiers and an adjustable tap 36 along the resistance 34 which divides the resistance into upper and lower parts designated $r_1$ and $r_2$. The voltmeter 35 and potentiometer 34 serve to indicate the center of gravity condition transverse to the longitudinal axis of the airplane and will be referred to as the transverse indicator. Connected across all three rectifiers through an ammeter 40 is a resistance 37, and a connection including a voltmeter 38 and adjustable tap 39 is made to this resistance from between the rectifiers 62 and 63. The resistance parts of potentiometer 37 above and below the tap are designated $r_3$ and $r_4$, respectively. The ammeter 40 is for indicating total loads, and voltmeter 38 and the potentiometer 37—39 are for indicating the center of gravity condition along the longitudinal axis of the airplane and will be referred to as the longitudinal indicator. The ammeter 40 may be calibrated in terms of the total weight since it measures the voltages $E_1 + E_2 + E_3$.

For locating the transverse center of gravity, I take moments about an axis running lengthwise through the center of the fuselage equally distant from and between the front wheels and passing through the rear wheel. This makes the transverse moment $E_3d_3$ equal to zero and the transverse moment $W_1d_1$ equal to $W_2d_2$, or, $$\frac{W_1}{W_2} = \frac{d_2}{d_1}$$

where $d_1$ is the distance from the left wheel to the center of gravity and $d_2$ the distance of the right wheel to the center of gravity. If in the circuit formed by $E_1$, $E_2$, $r_1$, $r_2$, 35, and 36, the transverse indicator 35 reads zero, it will be evident that $$\frac{E_1}{E_2} = \frac{r_1}{r_2}$$

If $E_1 = KW_1$ and $E_2 = KW_2$, then $$\frac{E_1}{E_2} = \frac{KW_1}{KW_2} = \frac{W_1}{W_2} = \frac{d_2}{d_1} = \frac{r_1}{r_2}$$

Since the ratio $$\frac{d_2}{d_1}$$

is the same as the resistance ratio $$\frac{r_1}{r_2}$$

the potentiometer connected to the transverse indicator can be calibrated to indicate this ratio as represented in Fig. 6, when the voltmeter 35 reads zero. It is also evident that $W_1 = W_2$ when $d_1 = d_2$ and that if the resistance 34 is uniform, voltmeter 35 will read zero when the tap 36 is at the center of the resistance with the center of gravity falling somewhere along the central longitudinal axis of the plane, and further, if it is necessary to move the tap to the right or left of center to bring voltmeter 35 to zero, the direction and extent of such movement are an indication of the direction and distance the center of gravity lies off center. For example, if instrument 35 reads zero with the tap 36 below center as shown connected in Fig. 6, it is evident that $E_1$ is larger than $E_2$ and that $W_1$ is greater than $W_2$ and that to rebalance, the load must be shifted from the left toward the right wheel. The relationship between $E_1E_2$, $r_1r_2$, $W_1W_2$, the left and right front wheels 1 and 2, and $d_1$ and $d_2$ is pictorially represented in Fig. 6a where it is assumed that the arrow indicated $W_1+W_2$ is the transverse center of gravity of the plane, and that the tap 36 leading to voltmeter 35 is adjusted for a zero voltmeter indication and $y$ is the center longitudinal axis of the plane. The instrument 35 is preferably a zero center, direct current instrument and can be used to indicate the direction and extent of unbalance or to obtain a desired unbalance loading of the plane. For instance, if due to the direction of the expected prevailing flying wind, it is desirable to have the load slightly to the right side of the plane, the tap 36 is moved up in Fig. 6 past center to the desired amount of unbalance, and then the plane loaded to bring the pointer of instrument 35 to zero. The connections to the instrument 35 or the resistance 34, or both, may be reversed and the parts oriented to obtain any desired direction of instrument indication or movement of the slider 36 for a particular direction of unbalance and suitable markings made on both the instrument scale and potentiometer. For instance, the left scale of the instrument may be marked L to indicate heavy left loading when the pointer is to the left of center, etc. and the slider 36 in center position.

To locate the center of gravity longitudinally, assume $d_4$ is the distance from the two front wheels to the center of gravity and $d_3$ is the distance from the rear wheel to the center of gravity, then $$(W_1+W_2)d_4 = W_3d_3 \text{ or } \frac{W_1+W_2}{W_3} = \frac{d_3}{d_4}$$

$$E_1 = KW_1,\ E_2 = KW_2,\ E_3 = KW_3$$

then $$\frac{E_1+E_2}{E_3} = \frac{KW_1+KW_2}{KW_3} = \frac{W_1+W_2}{W_3}$$

If the longitudinal indicator 38 reads zero in the circuit formed by $E_1$, $E_2$, $E_3$, $r_4$, $r_3$, 38, and 39, $$\frac{E_1+E_2}{E_3} = \frac{r_3}{r_4}$$

therefore $$\frac{r_3}{r_4} = \frac{d_3}{d_4}$$

The resistance ratio $$\frac{r_3}{r_4}$$

is the same as the distance ratio $$\frac{d_3}{d_4}, \text{ and } \frac{r_3}{r_4}$$

can be calibrated to indicate this ratio. The resistance ratio can be set to any desired loading center and the plane loaded to make the indicator read zero. A zero center, direct current instrument is also preferably used at 38.

It is evident that with both the transverse and longitudinal voltage comparing indicators available and continuously indicating during a plane loading operation, the plane may be correctly loaded as desired with a minimum of effort and without subsequent shifting of the load. The total load indication is also always available at instrument 40.

It is noted that the bridges have adjustable taps along their resistance arms 51, 52, and 53. These may be used for calibration purposes and may be used to balance the bridges when the plane is on the ground but unloaded, so that the apparatus will respond only to the pay load if that is desired; or the bridges may be adjusted off balance to take account of the weight and distribution of the weight of the plane when not loaded.

Level compensation

Ordinarily when a plane is on the ground, its tail is somewhat lower than it would be in normal level flight. Also, it may happen that sometimes during loading operations, the tail is lower than it is at other times. With the center of gravity usually located above, back of, and near the front wheels when the tail is raised to the normal level during a take-off, the center of gravity moves forward somewhat. To compensate for shifts in the center of gravity because of such changes in level, I may provide the transformer 20, Fig. 6, with one winding 45 shown as the primary, rotatable with respect to the secondary winding 46. This transformer is in the plane where usually the remainder of the apparatus described will be located, and it is oriented so that its rotary axis or shaft 47 is parallel to the transverse axis of the plane. The movable winding is further provided with a weight 48 which acts as a pendulum to keep the winding 45 at a fixed rotary position when the winding 46 is given a slight rotary motion due to changes in plane level such as mentioned above. During such relative movements of the windings the transformer acts not only as a transformer, but also as an induction voltage regulator to alter the voltages supplied to the three bridge circuits in direction and amount to compensate for changes in plane level on the shift of the center of gravity and, as a result, the center of gravity indicating apparatus accuracy is not impaired by such changes in level.

It is noted that the voltages for the two front wheel gauge voltages $E_1$ and $E_2$ are taken from the transformer taps 49 and 50, while the voltage for the rear wheel gauge voltage $E_3$ is taken from taps 54 and 55. If when the plane is level, the two sets of secondary taps are placed slightly away from and equally distant from the position of the primary input, as shown, the secondary voltages will all be equal.

Now when the tail of the plane is lowered, and assuming that the tail is to the left in Fig. 6, the front wheel voltages will be decreased and the rear wheel voltage $E_3$ will be increased slightly, which change in voltage is in the same direction as the shift of the center of gravity to the rear. By correctly adjusting the position of the taps 50 and 55, this change in voltage may be made approximately the correct amount to compensate for the effect of raising and lowering the tail on the shift of the center of gravity, and substantial elimination in error that would otherwise be caused thereby in most cases. In cases where the elevation of the center of gravity of the load within the plane is likely to vary and high accuracy level compensation is desired, I may use the compensating scheme explained in connection with Figs. 12 and 13. In Fig. 13 let the horizontal line CD represent the plane in which the strain gauges are located when the airplane is at one level, $d_3$ the horizontal distance from the rear wheel to the center of gravity, $d_4$ the horizontal distance from the axis of the front wheels to the center of gravity position, and $h$ the distance of the center of gravity above the plane CD. Now, when the tail of the airplane is elevated, the plane CD may be considered to have turned through the angle $\theta$ to position C'D, moving the center of gravity from position CG to position cg. $d_3$ and $d_4$ are changed to $d'_3$ and $d'_4$ respectively. The shift of the center of gravity forward in the airplane is a function of the distance $h$ and the angle $\theta$, thus, $$d'_3 = (d_3 + h \tan \theta) \cos \theta$$

$$d'_4 = (d_4 - h \tan \theta) \cos \theta$$

$$\frac{d'_3}{d'_4} = \frac{d_3 + h \tan \theta}{d_4 - h \tan \theta}$$

Compensation may be had by moving the longitudinal scale L, Fig. 6, relative to the adjustable tap 39 in Fig. 6 by an amount that is a function of distance $h$ and the angle $\theta$.

Figure 12:
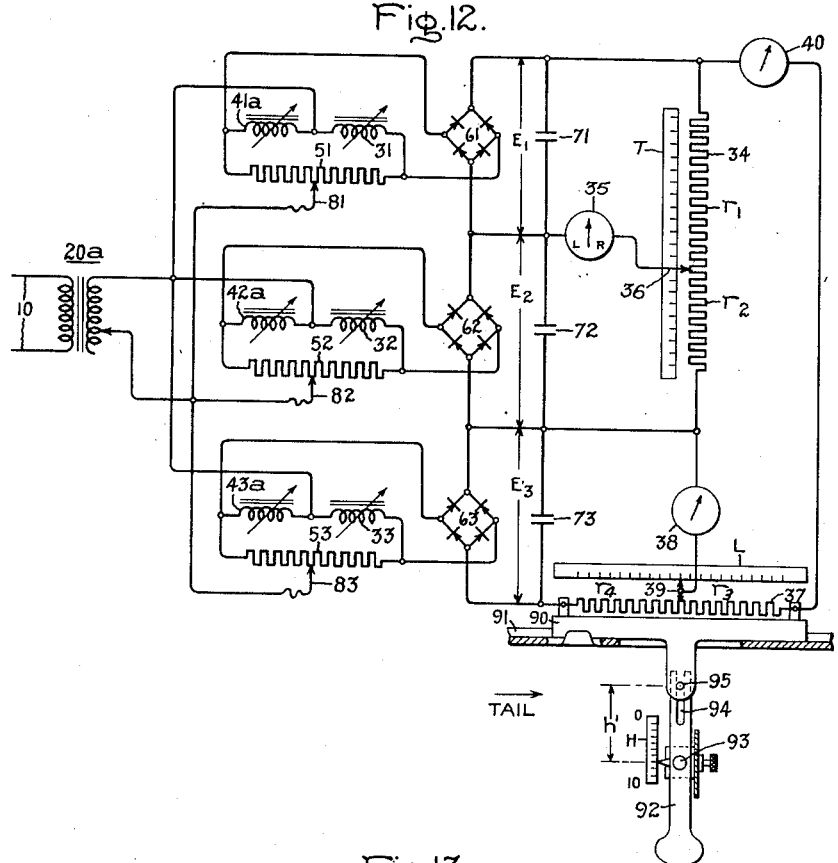
Figure 13:
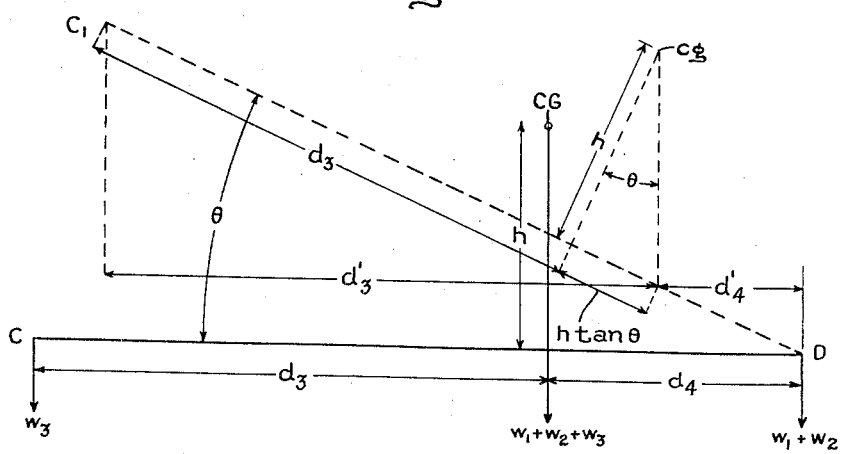

In Fig. 12 the scale L and the resistances $r_3$, $r_4$ are lined up with the airplane fuselage or with the line CD, Fig. 13. The resistance is shown mounted on a base 90 which may slide in a guideway 91. Ninety-two (92) is a pendulum pivoted at 93 and having a fork 94 engaging a pin 95 on the sliding base 90. It is thus evident that when the airplane is tipped, resistance $r_3$, $r_4$ will be moved with respect to tap 39 and scale L by an amount proportional to the tangent of the angle of tip, and that the extent of this sliding movement may be adjusted by adjusting the length of the lever arm of the pendulum above pivot 93. Hence, the pendulum and its pivot point are made vertically adjustable and the amount of such adjustment is gauged by a scale H, corresponding to the distance $h$, Fig. 13, which can be accurately ascertained in any given case. Thus the pendulum will move the resistor an amount proportional to $\tan \theta$ such as to make, $$\frac{d_3 + h \tan \theta}{d_4 - h \tan \theta} = \frac{r_3 + h' \tan \theta}{r_4 - h' \tan \theta} = \frac{d'_3}{d'_4}$$

where $h'$ is the distance of the pin 95 to pivot 93, Fig. 12.

Thus, the transformer at 20, Fig. 6, may have its secondary voltage fixed and the compensation of Fig. 12 used at scale L, the distance $h'$ being set for the particular airplane and loading involved. Also, the scale L may be moved manually by the correct amount when $\tan \theta$ and $h'$ are known or can be measured. Also, for a given airplane, $h$ and $\theta$ are often quite constant and a fixed correction can be added without using either automatic compensating device.

*Wind compensation*

When a plane is being loaded in a strong wind, the wind has more or less lift or possibly down pull as well as a lateral force on the plane, depending upon which way the plane is headed relative to the direction of the wind, and has the effect of changing the weight and weight distribution on the several wheels of the plane and as the wind changes in velocity and direction, this effect varies and unless compensated for may appreciably upset the accuracy of the center of gravity computer.

The wind effect may be compensated for by causing the wind to have the same influence on the three reactance bridge elements 41a, 42a, and 43a, Fig. 12, as it has on the weight responsive reactance bridge elements 31, 32, and 33, respectively. For example, I may provide each of the bridge elements 41a, 42a, and 43a with a spring positioned armature member 26a, Fig. 8, to which is attached by an adjustable universal coupling 56 a wind vane 57. When the computer apparatus is in use during windy weather, the bridge units 41a, 42a, and 43a equipped with such wind vanes are exposed to the wind in a fixed position relative to the plane and each bridge circuit is rebalanced prior to use by adjusting the several vanes 57. By so doing the wind will have approximately the same influence on the bridge units 41a, 42a, and 43a as it does on the weight responsive bridge units 31, 32, and 33 acting through the plane.

A preferred way of accomplishing this compensation is to provide a miniature scale model 58 of the plane being loaded and equip it with the bridge units 41b, 42b, and 43b in place of the left front, right front, and rear wheels as represented in Figs. 9 and 10. In Fig. 9, 58 represents a miniature scale model of the cargo or other plane on which my computer is being used. In place of wheels, it has weight responsive reactance bridge units such as shown in Fig. 10, and such adjustable bridge units are preferably used in Fig. 12 at 41a, 42a, and 43a in place of the type of adjustable reactors shown in Fig. 8. These adjustable reactors replace the bridge units 41, 42, and 43 in the circuit of Fig. 6. This miniature plane is placed in a position exposed to the wind and oriented to head in the same direction as the large plane and at the same tail level position as the large plane. It may, for example, be set out on the wing or fuselage of the large plane. When there is no wind and with the large plane unloaded, the several reactances 41b, 42b, and 43b are adjusted to balance the several bridges. This may be done, for example, by adjusting the position of core part 24 which rests on a leaf spring member 59 by thumb-screws 60, Fig. 10, and by adjusting the tap on the resistance bridge arms 51, Fig. 12. Now as the large plane is loaded, whether in a wind or otherwise, the computer apparatus operates as previously explained, the wind having the same influence on each half of the several reactance bridges and hence is compensated for. In Fig. 10, 65 are compression springs between the miniature plane and a foot member 66 which takes the place of a wheel.

In Fig. 9, I have also shown the miniature plane 58 with a plurality of holes 67 into which a plurality of weights such as represented at 68 may be placed and shifted about to simulate loading. These miniature weights may be calibrated to simulate tons or ½ tons each. That is, one small weight applied to the miniature plane may have the same effect as a correspondingly placed ton of load applied to the large airplane. The desired maximum load and its desired position for the large plane may be known or calculated, and a corresponding correctly proportioned miniature load such as represented at 68 may be added to the miniature standard in the correct position subsequent to the initial bridge balancing operation. Then with the taps 36 and 38 set to the desired positions, the large plane may be loaded until the transverse and longitudinal indicators 35 and 38 read zero and the instrument 40 indicates the correct total load. This illustrates the flexibility in the manner of using the apparatus.

Except for the miniature plane 58, Fig. 9, and the strain gauge units mounted on the wheel trunnions, the remainder of the apparatus may be housed in a suitable cabinet of the size of a small radio receiver, such as represented in Fig. 11, with the necessary instruments and adjustments exposed and accessible. The entire apparatus is of small weight and bulk and is preferably installed and carried on the plane as part of the regular equipment. It may use the 400-cycle power supply of the plane or a D.-C. supply with a tube type of oscillator or vibrator, since the amount of electrical energy required is small.

Although it is not now contemplated, I desire to point out that the pilot may use the weight responsive strain gauges on the several wheels of the plane to give an indication of landing forces and their distribution, and to indicate the decreasing weight and changing weight distribution on the wheels during a take-off.

While the transformer 20 of Fig. 6 may be included in the cabinet, Fig. 11, it will generally be preferable to mount it separately in fixed position in the plane near the usual longitudinal center of gravity position, so that it will always be properly oriented, whereas the cabinet may be portable so as to be moved about where it can best be observed during loading.

It will be evident that when the tap 36, Fig. 6, is moved to the upper end of resistance $r_1$, the voltmeter 35 may be used to indicate the condition of balance of the left front wheel bridge and when it is moved to the lower end of the resistance $r_2$, the voltmeter 35 will indicate the condition of balance of the right front wheel bridge; also, the tap 39 may be moved to the lower end of the resistance $r_3$ to indicate on voltmeter 38 the condition of balance of the rear wheel bridge. Connections for this purpose are indicated in dotted lines on the cabinet, Fig. 11, and the positions of the taps 36 and 39 for the bridge balance connections are marked on the panel. The resistance arm portions of these bridges 51, 52, and 53 are preferably included in the cabinet, Fig. 11, and the corresponding adjustable taps 81, 82, and 83 are adjustable by handles for such taps on the cabinet and indicated by the same reference characters. The several instruments and adjustments and the directions of adjustments and indications for "left" and "right," "front" and "rear" center of gravity indications are preferably arranged so as to avoid confusion. For instance, if the tap 36 is in central position and the voltmeter 35 reads to the left of zero center, it will indicate that the center of gravity is to the left of center. When the tap 36 is to the left of central position and the voltmeter 35 reads zero, this will also be an indication that the center of gravity is to the left of center; and when the tap 36 is turned to the extreme left, the voltmeter 35 is connected to indicate the condition of balance of the left front wheel bridge, and the adjusting means 81 for such bridge is positioned just below and to the left of the adjusting tap 36. I have shown the scales for the resistances 34 and 37, Fig. 6, as divided in twenty equal divisions, ten on each side of center. If the plane on which the apparatus is used has a 20-foot spacing between the front wheels, the transverse resistance scale shown on the cabinet may be calibrated directly in feet. Suitable instructions will be included on the panel for correctly applying these scales to planes having various dimensions between the front wheels and between the rear wheel and front wheels.

It has been mentioned that the voltage comparing center of gravity position determining apparatus may be calibrated to respond to the empty airplane, to the airplane plus its load, or to the load only, since this is merely a matter of how the apparatus is calibrated. In the appended claims where I speak of load or weight, center of gravity, etc., I intend that such expressions shall have a general meaning which will apply regardless of the particular calibration selected.

While the invention has been described and is particularly useful in connection with airplanes having the conventional two forward and one rear landing wheels, the invention and principles thereof are generally applicable to other vehicles, bodies, or masses having two or more points of support.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination with a body, means for supporting the weight of said body at a plurality of points and apparatus for determining the horizontal distance of the center of gravity of such body from a given axis of reference comprising a source of electric energy, means at each point of support for deriving voltages from said source proportional to the weight supported, a resistance graduated in distance units, a circuit for connecting the derived voltages in series and impressing the total thereof across said resistance, an instrument responsive to the total voltage of said circuit calibrated in terms of the total weight supported and a connection for impressing a selected portion of the derived voltage across an equal voltage portion of said resistance, said connection including a tap adjustable along said resistance and an indicator to indicate when said tap is correctly adjusted, the selected voltage portion being proportional to one of said weights and the position of said tap when properly adjusted indicating the horizontal distance of said weight from the center of gravity.

2. Apparatus for determining the horizontal position of the center of gravity of a body having a three-point support designated as points 1, 2, and 3 comprising a source of electric supply, means at each point of support for deriving a voltage from said source proportional to the weight supported, a uniformly graduated resistance across which the sum of the derived voltages from points 1 and 2 is impressed, a connection including a current indicator from a point between derived voltages 1 and 2 and a tap slidable along said resistance for indicating the horizontal position of the center of gravity along an axis between points 1 and 2, a uniformly graduated resistance across which the sum of all of said derived voltages is impressed, and a connection including a current indicator from a point between derived voltages 2 and 3, and a tap adjustable along the second-mentioned resistor for determining the horizontal center of gravity position along an axis at right angles to the first-mentioned axis.

3. Apparatus for determining the horizontal position of the center of gravity of a mass the weight of which is supported at three points comprising three electrical bridges, a source of electrical supply therefor, each point of support being provided with a variable impedance means which is included in one arm of the different electrical bridges, said variable impedance means being responsive to the weight supported at the corresponding points to produce proportionate output voltages from said bridges, a uniformly graduated potentiometer connected in series with two of said output voltages having a circuit connected from between said two voltages through a current indicator to an adjustable tap on said potentiometer, the position of said tap when there is no current flowing through the indicator indicating the horizontal position of the center of gravity along an axis between the points of support corresponding to the two voltages used, a second uniformly graduated potentiometer connected in series with all of said output voltages with the third output voltage shunted across an adjustable portion thereof through a current indicator and adjustable tap, the position of the latter tap when there is no current flowing in the corresponding indicator indicating the horizontal distance of the center of gravity away from the previously mentioned axis.

4. Apparatus for determining the horizontal position of the center of gravity of a mass the weight of which is supported at three points arranged in the form of a triangle comprising electrical responsive means at the three points of support for deriving voltages proportional to the weights supported at such points, means including a potentiometer resistance having a movable tap for comparing the relative magnitude of two of such voltages and indicating the horizontal position of the center of gravity along an axis between the corresponding points of support, means including a potentiometer resistance having a movable tap for comparing the sum of said two voltages with the other voltage and indicating the horizontal distance of the center of gravity from the axis referred to, and pendulum means having an adjustment for different elevations of the center of gravity of the mass above its points of support, positioned on said mass with one of said potentiometers for moving the potentiometer resistance thereof relative to its movable tap when the mass is tipped in a direction to shift the position of the center of gravity indicated, to compensate for such shift in order that the indication shall remain correct.

5. Apparatus for determining the horizontal position of the center of gravity of a mass the weight of which is supported at three points in triangular formation comprising three weight measuring electrical bridges, one associated with each point of support, each bridge having a variable impedance arm which is varied in response to changes in weight supported at the corresponding point, said bridges producing output voltages proportional to the weights supported, means for comparing the different voltages produced for the purpose of determining the horizontal position of the center of gravity of the mass relative to the points of support, said mass being exposed to the wind and of such character as to produce errors in the center of gravity determining apparatus if the influence of the wind is not compensated for, and means for compensating for such errors comprising variable impedance means in other arms of the several bridges, said last-mentioned impedance means having wind responsive adjusting means also exposed to the wind and arranged substantially as to nullify the effect of the wind on the mass in so far as the output voltages of the bridges are concerned.

6. Apparatus for determining the horizontal center of gravity of an airship and its load when supported at a plurality of points by its landing gear comprising an impedance bridge circuit associated with each one of such points of support having a variable impedance arm varied by and in response to the weight sustained by such support, a miniature model of an airship having a corresponding number and relationship of supporting points comprising variable impedances responsive to the weights supported and connected in balancing arms of the corresponding bridge circuits said bridge being calibrated so that when the airship and model are similarly exposed to the wind, variation of the impedances occasioned by the wind has a minimum influence on the outputs of the bridges, said bridges producing output voltages proportional to the load and distribution of load of the airship at the different supports thereof, and means graduated in suitable distance units applicable to the dimensions of such airship for comparing the output voltages of such bridges for the purpose of indicating the horizontal position of the center of gravity of the airship load in relation to a central point of such airship.

7. Apparatus for determining the center of gravity of a mass having its weight supported at two forward and one rear points, comprising response means at each of such supporting points for producing an output voltage which is proportional to the weight supported at the corresponding point, means for comparing the output voltages of the two forward response means for indicating the position of the center of gravity of the mass relative to its fore-and-aft central axis, means including a graduated resistance potentiometer for comparing the sum of the output voltages of the two forward response means with the output voltage of the rear response means to indicate the position of the center of gravity of the mass relative to a given transverse axis thereof, and means responsive to a summation of the output voltages of all of said response means for indicating the total mass.

8. Apparatus for determining the horizontal position of the center of gravity of a mass the weight of which is supported at three points arranged in a triangle, comprising electric controller means at the three points of support responsive to the weight supported at such points, an electrical system including an adjustable resistance for comparing the response of two of such means to indicate the horizontal position of the center of gravity along an axis between the corresponding points of support and an adjustable resistance for comparing the response of the third means with the sum of the responses of the first two means for indicating the horizontal distance of the center of gravity from such axis, and a pendulum operated electric controller responsive to the relative changes in level of one of said points of support with respect to the other two connected in adjusting relation with said system for compensating the last-mentioned indication obtained for such change in level.

THEODORE M. BERRY.

REFERENCES CITED

The following references are of record in the file of this patent:

UNITED STATES PATENTS

| Number | Name | Date |
|---|---|---|
| Re. 14,475 | Troll | May 21, 1918 |
| 1,407,078 | Murray | Feb. 21, 1922 |
| 1,864,876 | Westrum | June 28, 1932 |
| 2,242,011 | Malmberg | May 13, 1941 |
| 2,255,814 | Roche | Sept. 16, 1941 |
| 2,336,142 | Watson | Dec. 7, 1943 |
| 2,373,504 | Schlieben et al. | Apr. 10, 1945 |
| 2,391,243 | Hutton | Dec. 18, 1945 |

FOREIGN PATENTS

| Number | Country | Date |
|---|---|---|
| 387,887 | Great Britain | Feb. 16, 1933 |
| 356,158 | Germany | July 17, 1922 |

OTHER REFERENCES

"Characteristics and aircraft applications of wire resistance strain gages." article by A. W. De Forest, pages 112, 113, 114 and 136, vol. 15 of "Instruments," April 1942. (A photostatic copy is in Division 36, 73-88 (1).)

Certificate of Correction

Patent No. 2,540,807                                                   February 6, 1951

THEODORE M. BERRY

It is hereby certified that error appears in the printed specification of the above numbered patent requiring correction as follows:

Column 4, lines 10 to 12, inclusive, for that portion of the formula reading $$KE_1 = \frac{r_3}{R_3} \quad\quad \text{read} \quad\quad KE_1 \frac{r_3}{R_3}$$

and that the said Letters Patent should be read as corrected above, so that the same may conform to the record of the case in the Patent Office.

Signed and sealed this 19th day of June, A. D. 1951.

[SEAL]

THOMAS F. MURPHY,
*Assistant Commissioner of Patents.*